(12) United States Patent
Catalena

(10) Patent No.: US 10,841,749 B1
(45) Date of Patent: *Nov. 17, 2020

(54) PASSIVE ASSET TRACKING WITH EXISTING INFRASTRUCTURE

(71) Applicant: Troverlo, LLC, College Station, TX (US)

(72) Inventor: Cody William Catalena, College Station, TX (US)

(73) Assignee: TROVERLO, LLC, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,806

(22) Filed: Jun. 22, 2020

Related U.S. Application Data

(63) Continuation of application No. 16/570,195, filed on Sep. 13, 2019, now Pat. No. 10,728,709.

(51) Int. Cl.
| | |
|---|---|
| *H04W 24/00* | (2009.01) |
| *H04W 4/029* | (2018.01) |
| *H04W 48/16* | (2009.01) |
| *H04B 17/318* | (2015.01) |
| *H04W 4/02* | (2018.01) |
| *G01S 5/02* | (2010.01) |

(Continued)

(52) U.S. Cl.
CPC .......... *H04W 4/029* (2018.02); *G01S 5/0284* (2013.01); *H04B 17/318* (2015.01); *H04W 4/023* (2013.01); *H04W 48/08* (2013.01); *H04W 48/16* (2013.01); *H04W 48/20* (2013.01)

(58) Field of Classification Search
CPC ......... H04M 1/72569; H04M 1/72572; H04M 1/72577; H04M 2250/10; H04M 2250/12; H04M 1/72527; H04M 2250/02; H04M 2250/04; H04M 2250/06; H04M 2250/22; H04M 2250/52; H04W 4/029; H04W 4/027; H04W 12/12; H04W 12/1206; H04W 4/08; H04W 4/18; H04W 4/90; H04W 64/006; H04W 8/245; H04W 4/023; H04W 4/046; H04W 4/12; H04W 4/40; H04W 4/50; H04W 4/80; H04W 52/0254; H04W 8/02
USPC .................. 455/456.1, 456.4, 418
See application file for complete search history.

(56) References Cited

U.S. PATENT DOCUMENTS

| | | | |
|---|---|---|---|
| 8,433,334 B2 | 4/2013 | Huang et al. | |
| 9,042,917 B2 * | 5/2015 | Edge .................... | H04W 64/00 455/456.6 |
| 9,639,557 B2 | 5/2017 | Arslan et al. | |

(Continued)

OTHER PUBLICATIONS

USPTO non-final office action issued in U.S. Appl. No. 16/570,195, filed Sep. 13, 2019, dated Nov. 21, 2019.

(Continued)

*Primary Examiner* — Joseph Arevalo
(74) *Attorney, Agent, or Firm* — Basil M. Angelo; Angelo IP

(57) ABSTRACT

A method of passive asset tracking includes associating unique identifying information of a Wi-Fi access point with a moveable asset, receiving unique identifying information and information relating to a location of the Wi-Fi access point encountered by one or more wireless devices and storing at least some of the information received, and tracking a location of the associated asset by the location of the Wi-Fi access point.

21 Claims, 10 Drawing Sheets

| Time | Date | GPS LAT | GPS LNG | SSID | Asset | Signal Strength | AP LK LAT | AP LK LNG | AP CUR LAT | AP CUR LNG |
|---|---|---|---|---|---|---|---|---|---|---|
| 2:02 | 1-Sep | A | B | Asset1 | BSSID1 | 25% | A+ | B+ | A+ | B- |
| 2:05 | 1-Sep | A++ | B-- | Asset1 | BSSID1 | 75% | A+ | B- | A++ | B-- |
| 3:04 | 1-Sep | A++ | B- | Asset1 | BSSID1 | 95% | A++ | B-- | A++ | B- |
| 4:23 | 1-Sep | C | D | Asset2 | BSSID2 | 56% | C | D+ | C | D+ |
| 9:59 | 2-Sep | E | F | Asset3 | BSSID3 | 45% | E+ | F | E+ | F |

750

(51) Int. Cl.
*H04W 48/08* (2009.01)
*H04W 48/20* (2009.01)

(56) References Cited

U.S. PATENT DOCUMENTS

| | | |
|---|---|---|
| 10,217,078 B1 | 2/2019 | Klein |
| 10,459,593 B2 | 10/2019 | Tiwari et al. |
| 2005/0174961 A1* | 8/2005 | Hrastar ............. H04W 12/1206 370/328 |
| 2006/0046709 A1 | 3/2006 | Krumm et al. |
| 2014/0204926 A1 | 7/2014 | Ota et al. |
| 2015/0208454 A1 | 7/2015 | Cho et al. |
| 2015/0312404 A1 | 10/2015 | Abramson et al. |
| 2016/0066155 A1 | 3/2016 | Fan et al. |
| 2017/0118530 A1 | 4/2017 | Amano et al. |
| 2017/0219676 A1 | 8/2017 | Tran et al. |
| 2018/0069650 A1 | 3/2018 | Tran et al. |
| 2018/0295519 A1 | 10/2018 | Premnath et al. |
| 2018/0322376 A1 | 11/2018 | Henry et al. |
| 2019/0050806 A1 | 2/2019 | Klein |
| 2019/0174289 A1 | 6/2019 | Martin et al. |

OTHER PUBLICATIONS

USPTO non-final office action issued in U.S. Appl. No. 16/812,471, filed Mar. 9, 2020, dated Apr. 13, 2020.
USPTO non-final office action issued in U.S. Appl. No. 16/812,612, filed Mar. 9, 2020, dated Apr. 8, 2020.
USPTO Notice of Allowance for U.S. Appl. No. 16/570,195, filed Sep. 13, 2019, dated Apr. 30, 2020.

* cited by examiner

740

| Time | Date | GPS LAT | GPS LNG | SSID | BSSID | Signal Strength |
|---|---|---|---|---|---|---|
| 2:02 | 1-Sep | A | B | Asset1 | BSSID1 | 25% |
| 2:05 | 1-Sep | A++ | B-- | Asset1 | BSSID1 | 75% |
| 3:04 | 1-Sep | A++ | B- | Asset1 | BSSID1 | 95% |
| 4:23 | 1-Sep | C | D | Asset2 | BSSID2 | 56% |
| 9:59 | 2-Sep | E | F | Asset3 | BSSID3 | 45% |

| Time | Date | GPS LAT | GPS LNG | SSID | Asset | Signal Strength | AP LK LAT | AP LK LNG | AP CUR LAT | AP CUR LNG |
|---|---|---|---|---|---|---|---|---|---|---|
| 2:02 | 1-Sep | A | B | Asset1 | BSSID1 | 25% | A+ | B+ | A+ | B- |
| 2:05 | 1-Sep | A++ | B-- | Asset1 | BSSID1 | 75% | A+ | B- | A++ | B-- |
| 3:04 | 1-Sep | A++ | B- | Asset1 | BSSID1 | 95% | A++ | B-- | A++ | B- |
| 4:23 | 1-Sep | C | D | Asset2 | BSSID2 | 56% | C | D+ | C | D+ |
| 9:59 | 2-Sep | E | F | Asset3 | BSSID3 | 45% | E+ | F | E+ | F |

FIG. 7C

PASSIVE ASSET TRACKING WITH EXISTING INFRASTRUCTURE

CROSS-REFERENCE TO RELATED APPLICATIONS

This application is a continuation of U.S. patent application Ser. No. 16/570,195, filed on Sep. 13, 2019, which is hereby incorporated by reference in its entirety.

BACKGROUND OF THE INVENTION

Wireless networking refers to the wireless exchange of information between network nodes with electromagnetic signaling. Standards setting organizations, such as the Institute of Electrical and Electronics Engineers ("IEEE"), coordinate, develop, promulgate, and maintain technical standards that facilitate implementation of wireless network standards that ensure compatibility between competing original equipment manufacturers and thereby seek to achieve widespread adoption of their respective technologies. The ubiquitous IEEE 802.11 standard specifies a Wireless Local Area Network ("WLAN") technology, commonly referred to as Wi-Fi, that facilitates wireless communication between devices and often serves as a bridge to a network carrying Internet Protocol traffic. Wi-Fi typically operates at either 2.4 GHz or 5 GHz frequency bands in the radio portion of the electromagnetic spectrum.

In its first iterations, the IEEE 802.11a/b standards specified transfer rates of up to 11 Mbps at a range of up to 150 feet. The IEEE 802.11g amendment implemented various improvements, including Orthogonal Frequency Division Multiplexing ("OFDM"), to increase transfer rates to up to 54 Mbps while maintaining backward compatibility with IEEE 802.11b. The IEEE 802.11n amendment added Multiple Input Multiple Output ("MIMO") functionality where multiple transmitters and receivers operate simultaneously at one or both ends of the link to facilitate transfer rates of up to 300 Mbps and even higher if additional antennae are used. The IEEE 802.11ac amendment added support for spatial streams and increased channel widths to substantially increase transfer rates from 433 Mbps to several Gbps and works exclusively in the less crowded 5 GHz frequency band and at a range of up to 300 feet or more.

The IEEE 802.11 standard remains an evolving technical standard and future amendments will likely seek to increase transfer rates, improve connectivity in challenging environments, and enhance security. As such, Wi-Fi remains the most widely adopted wireless networking standard in the world and will likely remain so for the foreseeable future.

BRIEF SUMMARY OF THE INVENTION

According to one aspect of one or more embodiments of the present invention, a method of passive asset tracking includes associating unique identifying information of a Wi-Fi access point with a moveable asset, receiving unique identifying information and information relating to a location of the Wi-Fi access point encountered by one or more wireless devices and storing at least some of the information received, and tracking a location of the associated asset by the location of the Wi-Fi access point.

According to one aspect of one or more embodiments of the present invention, a non-transitory computer readable medium comprising software instructions that, when executed by a processor perform a method of passive asset tracking that includes associating unique identifying information of a Wi-Fi access point with a moveable asset, receiving unique identifying information and information relating to a location of the Wi-Fi access point encountered by one or more wireless devices and storing at least some of the information received, and tracking a location of the associated asset by the location of the Wi-Fi access point.

According to one aspect of one or more embodiments of the present invention, a system for passive asset tracking includes a computing system having a central processing unit, a system memory, a network interface, and a storage device, and a Wi-Fi access point disposed on, or otherwise attached to, or integrated with, a moveable asset to be tracked. An asset tracking database executing on the computing system associates unique identifying information of the Wi-Fi access point with the asset. In addition, the asset tracking database receives information relating to a location of the Wi-Fi access point identified by its unique identifying information transmitted as part of wireless network discovery and the asset tracking database tracks a location of the associated asset by the location of Wi-Fi access point.

Other aspects of the present invention will be apparent from the following description and claims.

BRIEF DESCRIPTION OF THE DRAWINGS

FIG. 7B shows exemplary data reported by a wireless device relating to discovered Wi-Fi access points in accordance with one or more embodiments of the present invention.

FIG. 7C shows exemplary data stored or generated by an asset tracking database in accordance with one or more embodiments of the present invention.

DETAILED DESCRIPTION OF THE INVENTION

Figure 1:
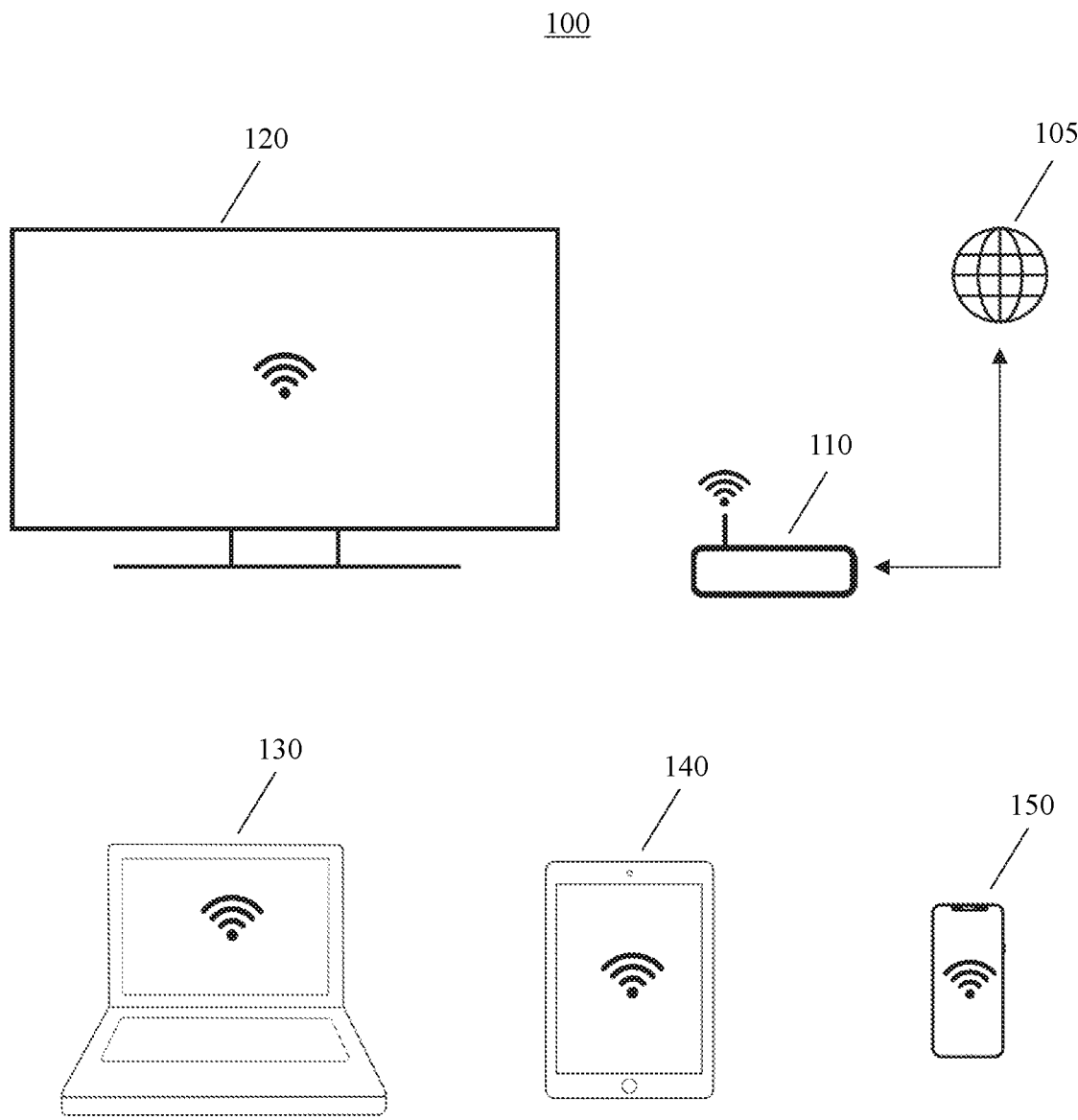
FIG. 1 shows a conventional Wi-Fi wireless network.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention.

Conventional asset tracking systems use dedicated and complicated hardware and software systems to track physical assets, typically within the confines of a fixed location or from portal-to-portal of one or more fixed locations. Conventional asset tracking systems typically use, for example, barcode, Near-Field Communication ("NFC"), Bluetooth Low Energy ("BLE"), Radio-Frequency Identification ("RFID") tags, and Global Positioning System ("GPS") to tag and affirmatively track assets within their respective asset tracking system. In typical applications, the asset tracking task is affirmatively performed by dedicated hardware and software systems intentionally deployed for the asset tracking task. As such, an inherent limitation in conventional asset tracking systems is the requirement that the tagging, tracking, hardware, and software systems must be intentionally deployed, span the zone of coverage, and actively perform and manage the asset tracking task. This requires extensive investment in expensive hardware and software systems and in hiring and training personnel on its usage. Moreover, in a widespread deployment of assets across many sites, perhaps even around the world, it is exceptionally difficult and cost prohibitive to deploy and manage a coherent conventional asset tracking system.

Accordingly, in one or more embodiments of the present invention, a method and system of passive asset tracking with existing infrastructure allows for passively tracking moveable assets by one or more wireless devices that are in-range of Wi-Fi signals even though the wireless device, or user thereof, may not even know they are participating in the asset tracking task. In this way, every smartphone in the vicinity of an asset that is desired to be tracked may, anonymously, and without awareness, participate in the asset tracking task. Specifically, moveable assets may be passively tracked by one or more unrelated wireless devices whenever the one or more of the wireless devices merely come into range of one or more assets associated with a Wi-Fi access point broadcasting Wi-Fi signals, without any intent or awareness on the part of the wireless device, or user thereof, that they are participating in the asset tracking task due to the nature of the Wi-Fi wireless network discovery protocol. In addition, the method and system leverage existing infrastructure inherent in smartphones and smartphone operating systems to report their location as well as the unique identifying information of Wi-Fi access points they encounter for improving the accuracy of location-based services. Advantageously, the Wi-Fi wireless network discovery protocol as well as the Wi-Fi access point reporting feature of smartphones may be cooperatively used to passively track assets associated with Wi-Fi access points by one or more wireless devices without requiring that the wireless devices associate with any particular Wi-Fi access point, using publicly accessibly Wi-Fi signals, and in passive scanning applications, completely anonymously with respect to the asset tracking task.

FIG. 1 shows a conventional Wi-Fi wireless network 100. A conventional Wi-Fi wireless network 100 typically includes a broadband modem 105 that provides high-speed Internet connectivity to one or more wireless devices (e.g., 120, 130, 140, and 150) via a Wi-Fi access point 110. Wi-Fi access point 110 typically facilitates wireless connectivity between one or more of the wireless devices and, in configurations that include an integrated router, may serve as the bridge between the wireless devices (e.g., 120, 130, 140, and 150) and the Internet connection provided by broadband modem 105. In conventional use, a wireless connection may be established between one or more wireless devices (e.g., 120, 130, 140, and 150), including, for example, a television 120, computer 130, tablet computer 140, smartphone 150, or any other wireless device, and Wi-Fi access point 110, thereby allowing the wireless devices (e.g., 120, 130, 140, and 150) to communicate with one another and access the Internet via broadband modem 105. Wi-Fi access points 110 are commonly found in homes, offices, and public places, where they are often referred to as Wi-Fi hotspots. While the number of Wi-Fi access points 110 has not been definitively counted, there are believed to be in excess of one billion Wi-Fi access points 110 around the world. Efforts to map Wi-Fi signal coverage suggest that most modern cities are blanketed with publicly accessible Wi-Fi signals. Notwithstanding the above, one of ordinary skill in the art will recognize that a conventional Wi-Fi network 100 does not require a broadband modem 105 or Internet connectivity and may be used as a purely wireless network to facilitate wireless communications between one or more wireless devices (e.g., 120, 130, 140, and 150).

Figure 2:
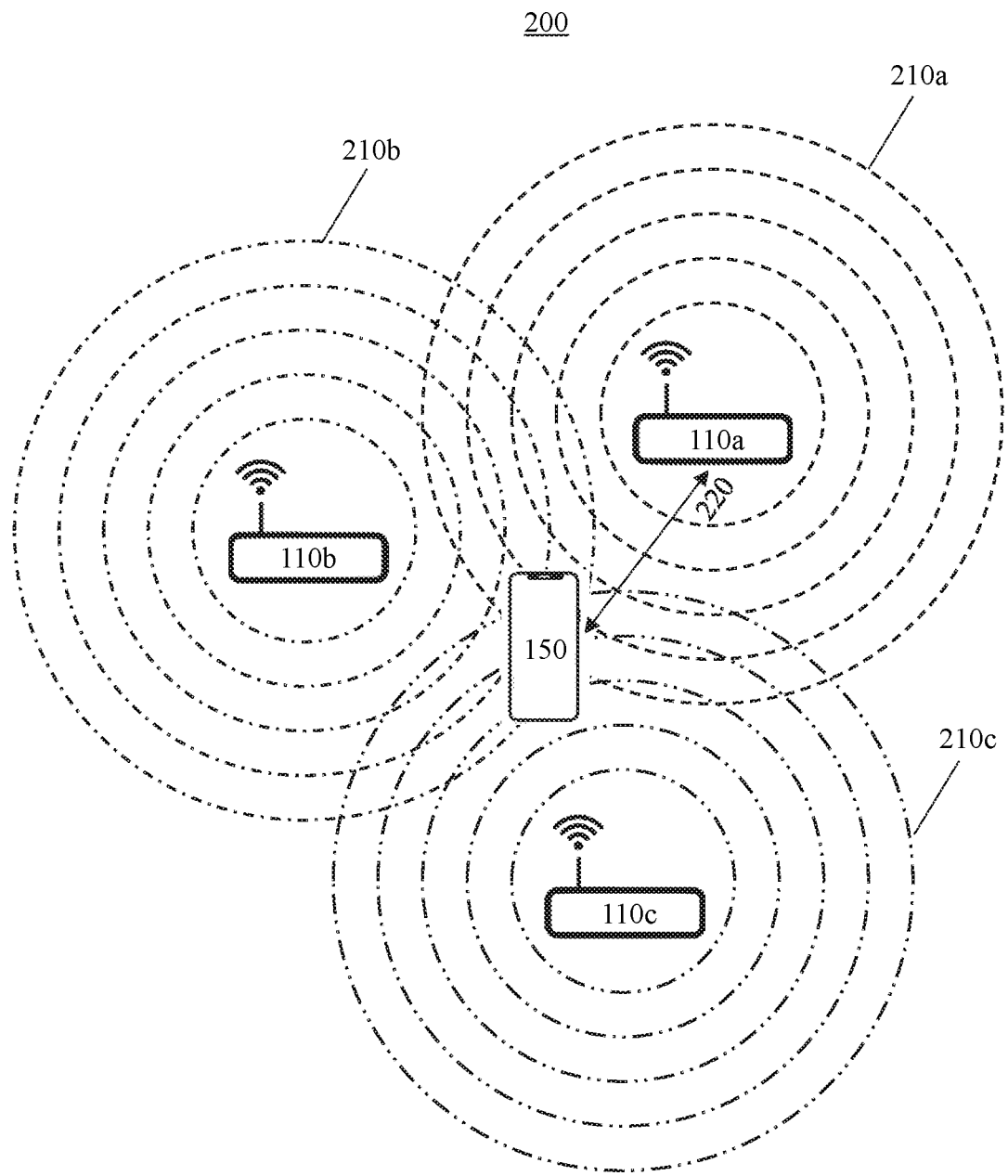
FIG. 2 shows passive scanning mode as part of Wi-Fi wireless network discovery.

FIG. 2 shows passive scanning mode 200 as part of Wi-Fi wireless network discovery. Wi-Fi wireless network discovery is the process by which a wireless device identifies and potentially associates with an in-range Wi-Fi access point 110. In passive scanning mode, one or more wireless devices 150 listen for beacon frames (not shown) broadcast 210 at periodic intervals by one or more in-range Wi-Fi access points 110 to announce the presence of their respective wireless networks. Beacon frames are a type of management frame that includes information regarding the broadcasting Wi-Fi access point 110 to facilitate potential association and connectivity. Each beacon frame includes a Service Set Identifier ("SSID"), which is typically a user-given name for the broadcasting Wi-Fi wireless network, and information that uniquely identifies the Wi-Fi access point 110 including, but not limited to, a Basic Service Set Identifier ("BSSID"), which is a unique Media Access Control ("MAC") address of the Wi-Fi access point 110 or a broadcasting band thereof. Multiple Wi-Fi access points 110 may share the same SSID as part of the same wireless network, but each Wi-Fi access point 110 will have a unique BSSID. Moreover, dual or multi-band Wi-Fi access points 110 that broadcast on multiple frequency bands, typically have a unique BSSID for each frequency band that they broadcast on.

A wireless device (e.g., smartphone 150) may be statically or transiently located within the broadcast range of one or more Wi-Fi access points (e.g., 110a, 110b, and 110c). Each Wi-Fi access point 110 may periodically broadcast their beacon frame (e.g., 210a, 210b, and 210c) announcing the presence of their respective Wi-Fi wireless network. Wireless device 150 may listen to, and receive, beacon frames from the in-range Wi-Fi access points (e.g., 110a, 110b, and 110c). In conventional applications, a user of wireless device 150 may optionally select, on their device, the SSID of the Wi-Fi access point 110a of the Wi-Fi wireless network that they wish to join and then communicate 220 with the Wi-Fi access point 110a to establish wireless connectivity. It is important to note that, passive scanning 200 is completely anonymous with respect to wireless devices 150 that receive the beacon frames of in-range Wi-Fi access points 110 until such time that they choose to associate with a particular Wi-Fi access point 110. Unless and until a user of a wireless device 150 selects a specific Wi-Fi access point 110 and network thereof to associate with, wireless device 150 may passively receive the Wi-Fi signals being publicly broadcast and remain completely anonymous.

Figure 3:
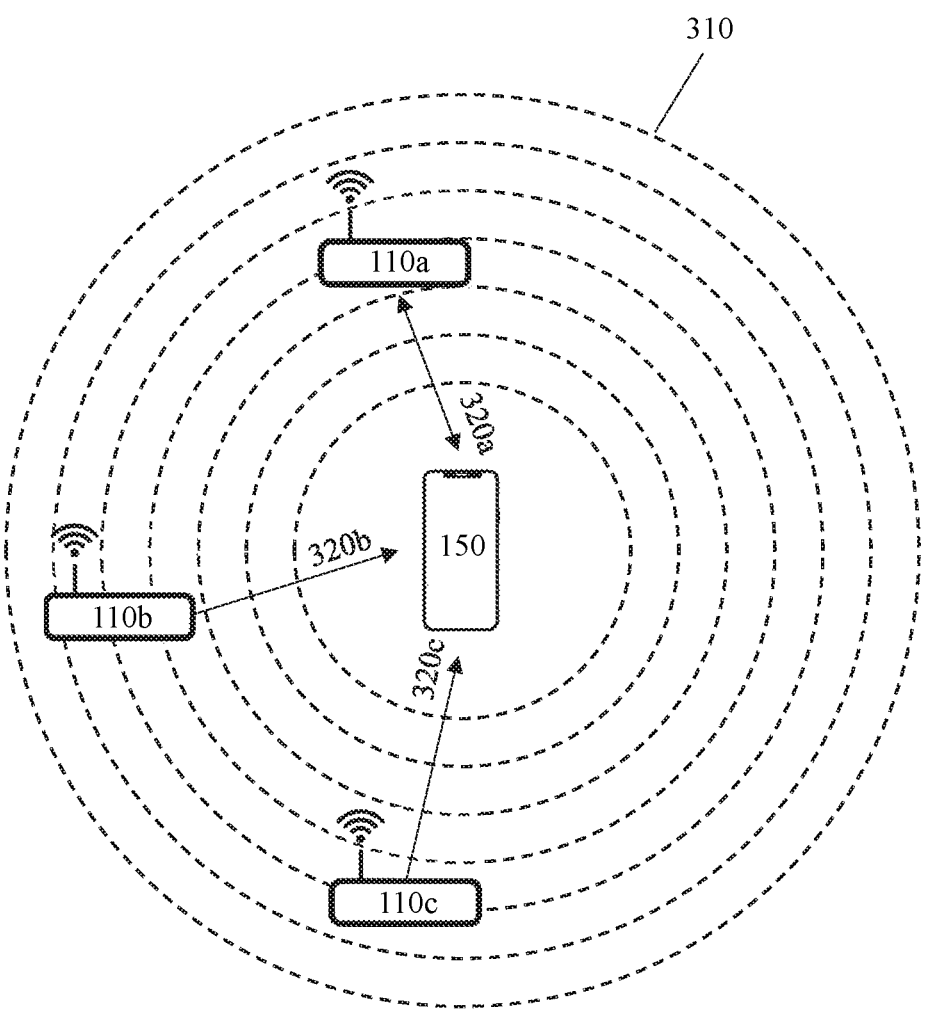
FIG. 3 shows active scanning mode as part of Wi-Fi wireless network discovery.

FIG. 3 shows active scanning mode 300 as part of Wi-Fi wireless network discovery. In contrast to passive scanning mode, active scanning is a type of Wi-Fi wireless network discovery process where a wireless device 150 broadcasts a probe request 310 to a specific (not shown) or all Wi-Fi access points (e.g., 110*a*, 110*b*, and 110*c*) that are within range. A probe request is a type of management frame that may include information about the specific Wi-Fi access point (e.g., 110) that the wireless device 150 wishes to associate with, sometimes referred to as a directed probe request, or may probe for all available Wi-Fi access points 110 within range, sometimes referred to as a null probe request. Responding in-range Wi-Fi access points 110*a*, 110*b*, and 110*c* transmit a probe response 320*a*, 320*b*, and 320*c* that includes information substantially similar to a beacon frame including their respective SSID and unique BSSID. In contrast to passive scanning (e.g., 200) where each Wi-Fi access point 110 broadcasts its respective beacon frames on a specific channel, in active scanning (e.g., 300), wireless device 150 broadcasts probe requests 310 across all available channels for the associated frequency band. In this way, wireless device 150 may, for example, select a Wi-Fi access point 110 that provides the strongest signal strength and quality. Moreover, even when a particular wireless device 150 is associated with a specific Wi-Fi access point (e.g., 110*a*), wireless device 150 may go off channel and continue to send probe requests 310 on other channels. By continuing to actively probe for Wi-Fi access points 110, wireless device 150 may maintain a list of known Wi-Fi access points 110 that may facilitate roaming should the wireless device 150 move out of range of the currently associated Wi-Fi access point 110. In contrast to passive scanning (e.g., 200), active scanning operations 300 only require a wireless device 150 to send a probe request on a specific channel within the designated frequency band and then listen for a comparatively smaller amount of time as compared to passive scanning (e.g., 200). As such, active scanning 300 presents a more directed approach to wireless network discovery as compared to passive scanning operations (e.g., 200).

Figure 4:
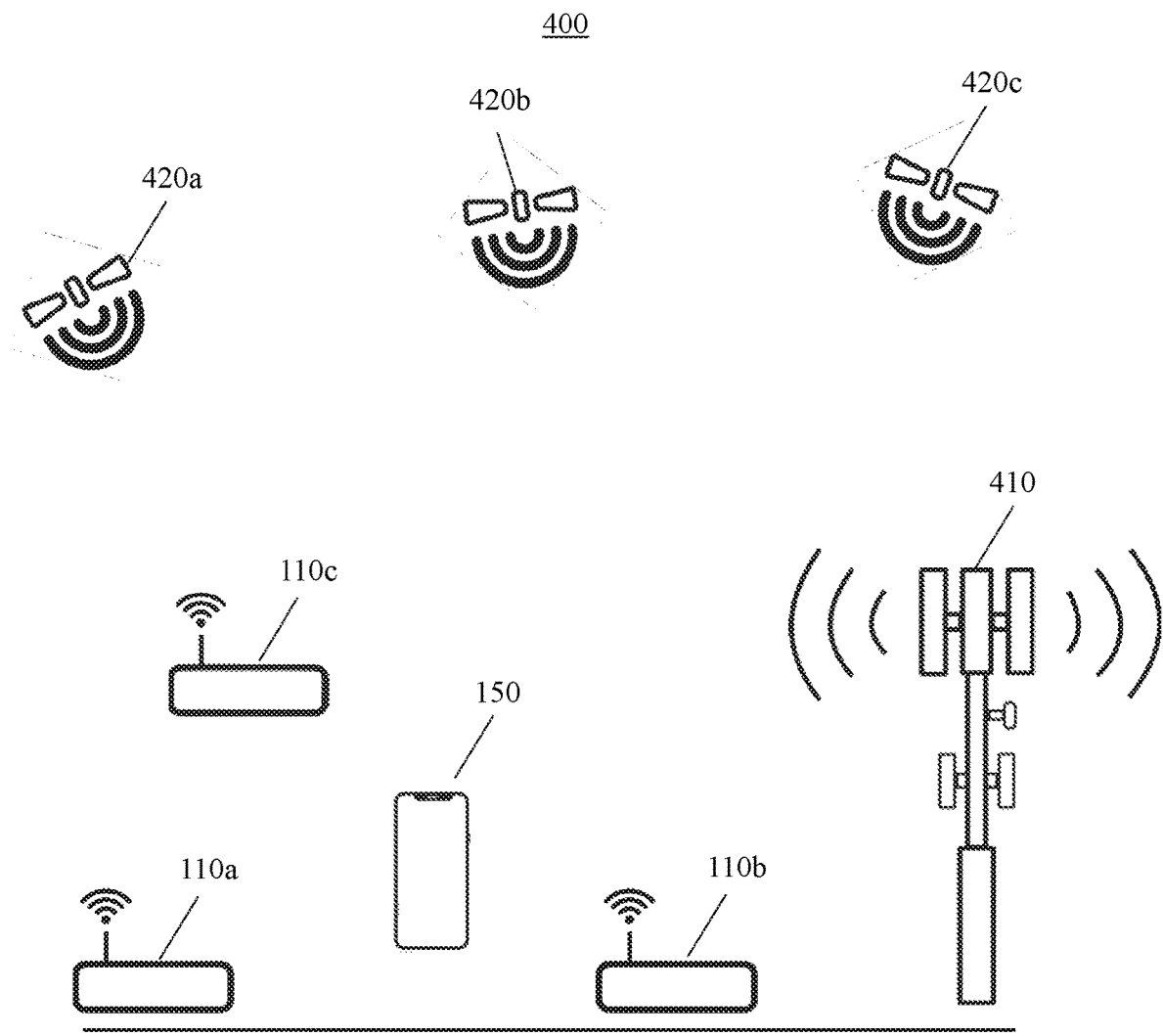
FIG. 4 shows various wireless networking technologies used to determine a location of a wireless device and Wi-Fi access points.

FIG. 4 shows various wireless networking technologies used to determine a location of a wireless device 150 and one or more Wi-Fi access points 110. Wireless device 150, which may be a smartphone or any other type or kind of wireless device, may establish a cellular connection with one or more cell towers 410 providing cellular network connectivity. An established connection to a particular cell tower 410 may, in some circumstances, be used to establish a location of wireless device 150 within a determinable radius of the particular cellular tower 410. Further, patterns of connectivity to one or more cell towers 410 may be used to establish a location or potentially even the movement of wireless device 150 within a determinable radius. However, these techniques are rarely used outside of law enforcement. Instead, wireless devices 150 typically rely on GPS to determine their location. Most wireless devices 150 include a GPS receiver (not independently shown) capable of receiving one or more GPS signals (not shown) from one or more GPS satellites (e.g., 420*a*, 420*b*, and 420*c*) in Earth orbit. Typically, there are at least four GPS satellites 420 visible to a wireless device 150 no matter where it is located, anywhere around the globe. Each GPS satellite 420 transmits a GPS signal (not shown) that includes information about the satellite's current position and the current time at regular intervals. The GPS receiver of wireless device 150 receives one or more of these GPS signals and calculates how far away it is from each satellite based on how long it took for each respective GPS signal to arrive. If the wireless device 150 receives the GPS signal from at least three GPS satellites 420, the location of the wireless device 150 may be determined with a high degree of accuracy by a process referred to as trilateration. The GPS derived location of wireless device 150 may be determined continuously, periodically, or upon the execution of software that requires location services, such as, for example, navigation software or a web browser used to search nearby places. The accuracy of GPS is within a radius of approximately 16 ft under open skies and good conditions but worsens near structures and obstructions.

As such, a wireless device 150 may use one or more in-range Wi-Fi access points (e.g., 110*a*, 110*b*, or 110*c*) to improve the accuracy of the GPS location determination and, in instances when GPS is not available, determine its location based on Wi-Fi alone. As part of the Wi-Fi wireless network discovery process, wireless device 150 typically determines the signal strength of the Wi-Fi signals broadcast by the in-range Wi-Fi access points (e.g., 110*a*, 110*b*, or 110*c*). Assuming, for the purpose of this discussion, that the location of one or more Wi-Fi access points (e.g., 110*a*, 110*b*, or 110*c*) are already known to a certain degree of accuracy, the signal strengths may be used to refine the accuracy of the GPS location determination and, in instances when GPS is not available, determine the location of the wireless device 150 based on Wi-Fi alone. For example, the known location of a Wi-Fi access point (e.g., 110*a*) and the signal strength of the Wi-Fi signal received from it may be used in conjunction with the signal strength and known location of other Wi-Fi access points (e.g., 110*b* and 110*c*) to refine or determine the location of wireless device 150 by a process referred to as triangulation. It is important to note that the signal strength of the Wi-Fi signals received by wireless device 150 from one or more Wi-Fi access points 110 are determined without requiring wireless device 150 to associate with or otherwise join any particular Wi-Fi access point (e.g., 110*a*, 110*b*, or 110*c*). As such, wireless device 150 may use publicly broadcast Wi-Fi signals of in-range Wi-Fi access points 110 that it does not use or otherwise associate with in any way.

Above, an assumption was made that the location of one or more Wi-Fi access points 110 were known to a certain degree of accuracy. This assumption holds true because wireless devices 150 report in-range Wi-Fi access points 110 as well as their current location to the original equipment manufacturer, operating system developer, or other third-party who maintain a database, sometimes referred to herein as a Wi-Fi AP Database, for use in improving the accuracy of location determination as well as other location-related services (i.e., significant locations, location-based suggestions, location-based alerts, popular near me, and the like). While this benefits the user of the wireless device 150 in providing improved services, each wireless device 150 discovers the existence, and reports the location, of Wi-Fi access points 110 it encounters on an ongoing continuous basis. This is commonly performed as part of, for example, iOS® and Android® location services and it is generally available to third-party software developers for their use. In addition, many public and private companies maintain a centralized database that contains the identifying information and location of known Wi-Fi access points 110. It is important to note that this information is anonymously obtained through publicly accessible Wi-Fi signals and in accordance with the terms and conditions of use of most smartphones, that typically provide the user with the option of opting-out of participation in such services.

Figure 5:
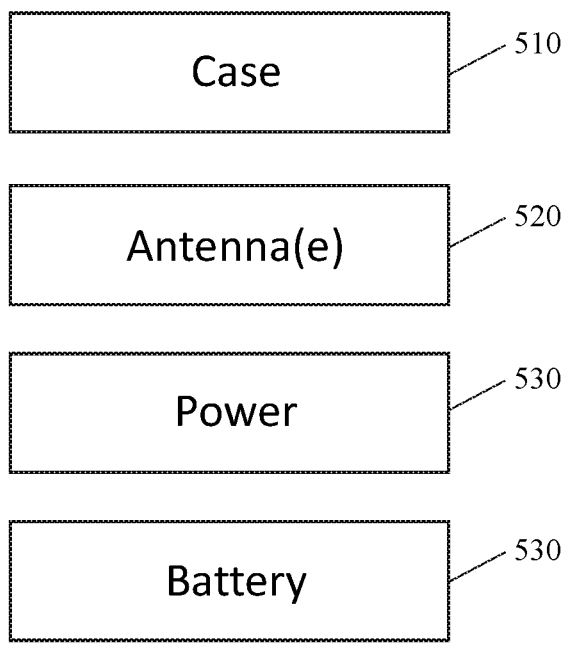
FIG. 5 shows a block diagram of a conventional Wi-Fi access point.

FIG. 5 shows a block diagram of a conventional Wi-Fi access point 110. A conventional Wi-Fi access point 110 includes a printed circuit board and related components (not shown) disposed within a casing or enclosure 510, which may be integrated into other devices or equipment depending on the application or design. Wi-Fi access point 110 typically includes one or more antennae 520 for transmitting and receiving radio frequency Wi-Fi signals, and a power source 530. In conventional applications, power source 530 is traditionally a DC power input, however, some industrial and commercial applications use AC power input, and still other applications use battery-powered power input. Wi-Fi access point 110 may or may not include an integrated router and the associated connectivity. As such, in certain embodiments, Wi-Fi access point 110 may consist of a pure wireless access point that does not include a router and does not provide any bridge functionality to reduce the size, complexity, and power consumption of the device. In other embodiments, Wi-Fi access point 110 may not even function as an access point, but spoof the Wi-Fi wireless network discovery protocol, transmitting beacon frames and probe responses as if it was a functional Wi-Fi access point 110. Notwithstanding the above, one of ordinary skill in the art will recognize that any Wi-Fi access point 110 or other device capable of participating in the Wi-Fi wireless network discovery protocol as if it were a bona fide Wi-Fi access point 110 may be used in accordance with one or more embodiments of the present invention.

Figure 6:
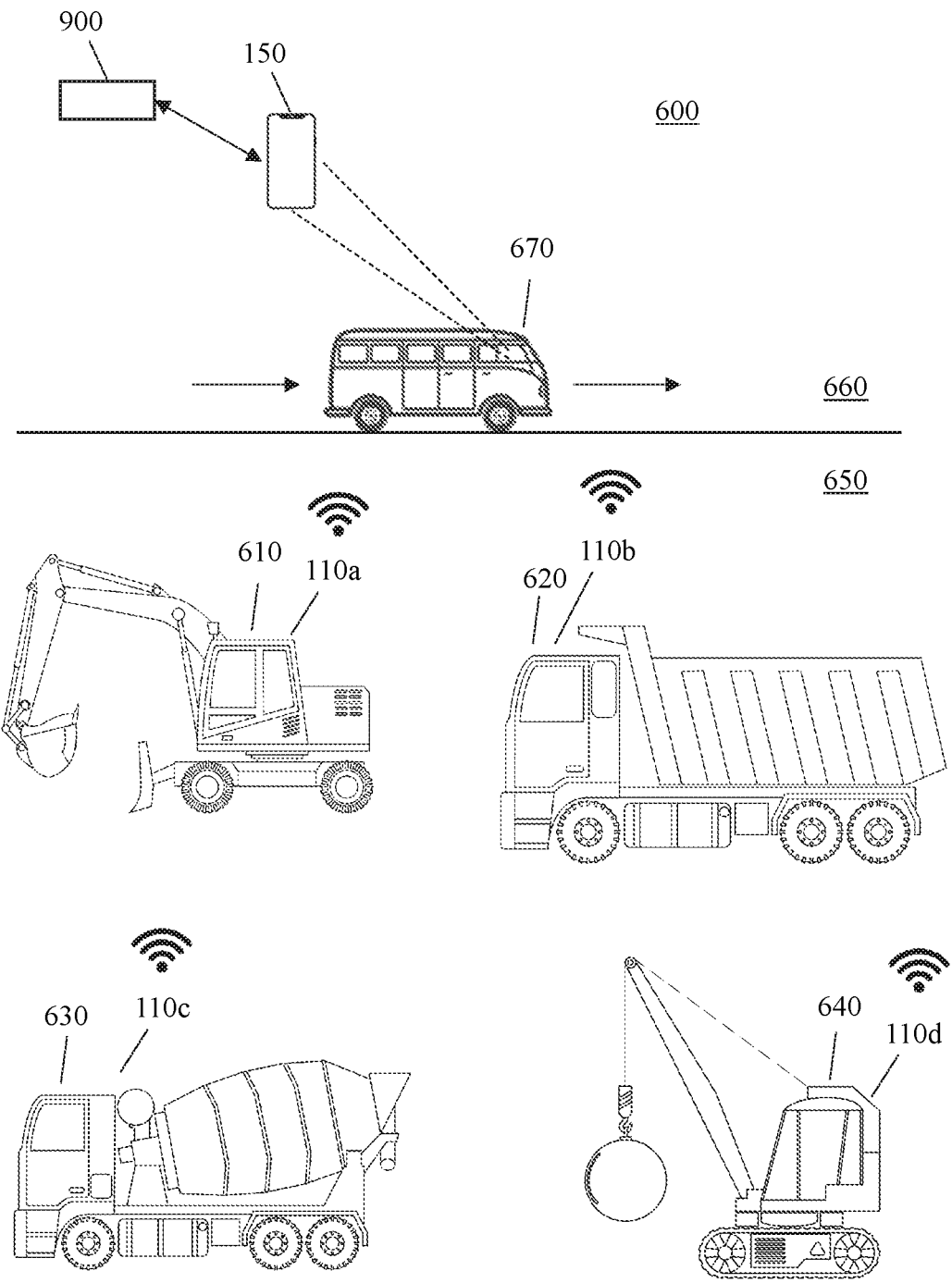
FIG. 6 shows an exemplary application of passive asset tracking with existing infrastructure in accordance with one or more embodiments of the present invention.

FIG. 6 shows an exemplary application of passive asset tracking with existing infrastructure 600 in accordance with one or more embodiments of the present invention. Specifically, in one or more embodiments of the present invention, one or more assets may be passively tracked by one or more wireless devices 150 that are in-range, or even come in and go out of range, of assets configured to broadcast Wi-Fi signals even though a wireless device 150, or user thereof, may not even know that they are participating in the asset tracking task. As such, for the purpose of this disclosure, passive asset tracking means tracking an asset indirectly without necessarily requiring the purposeful association of any particular wireless device 150, or user thereof, with any particular Wi-Fi access point 110. Accordingly, in certain embodiments, assets may be passively tracked by one or more wireless devices 150 that merely happen to come in-range of one or more assets broadcasting Wi-Fi signals even though a wireless device 150, or user thereof, may or may not be aware that they are taking part in the asset tracking task. In other embodiments, one or more wireless devices 150 may passively track assets in a purposeful manner, whereby a wireless device 150 intentionally interacts with one or more Wi-Fi access points 110 associated with assets deployed in the field 650. In all such embodiments, the Wi-Fi wireless network discovery process may be advantageously used by one or more wireless devices 150 to passively track assets without requiring that they associate with any particular Wi-Fi access point 110, using publicly accessible Wi-Fi signals, and in passive scanning applications, anonymously with respect to the asset tracking task.

Returning to the figure, in one or more embodiments of the present invention, one or more Wi-Fi access points (e.g., 110a, 110b, 110c, and 110d) may be disposed, or otherwise attached to, or even integrated with, one or more assets (e.g., 610, 620, 630, and 640) that may be deployed in the field 650. For the purpose of illustration only, construction equipment (e.g., 610, 620, 630, and 640) is shown in the figure as exemplars of assets to be tracked. However, one of ordinary skill in the art will recognize that any asset may be tracked in accordance with one or more embodiments of the present invention. The Wi-Fi access points 110 are not required to participate in any particular wireless network or any wireless network at all, as the Wi-Fi access points 110 may be used for the sole purpose of uniquely identifying an asset that is desired to be tracked. Specifically, each Wi-Fi access point 110 disposed on, or otherwise attached to, an asset (e.g., 610, 620, 630, and 640) may broadcast beacon frames in passive scanning mode and/or respond to probe requests as part of active scanning mode, where either the beacon frame (not shown) or probe response (not shown) includes information that uniquely identifies the Wi-Fi access point 110, and by association with a particular asset (e.g., 610, 620, 630, and 640), the asset itself. One of ordinary skill in the art will recognize that the beacon frame or probe response may contain other information that may be customized or helpful to the asset tracking task.

In certain embodiments, in passive scanning mode, the Wi-Fi access points (e.g., 110a, 110b, 110c, and 110d) physically and logically associated with assets (e.g., 610, 620, 630, and 640) may broadcast beacon frames at regular intervals, each of which includes information that uniquely identifies the particular Wi-Fi access point 110 and, to those who recognize the association, the asset (e.g., 610, 620, 630, and 640) associated with it. One or more wireless devices 150 may come in-range of one or more Wi-Fi access points 110 and receive one or more beacon frames. As previously discussed, wireless devices 150 report, via a cellular or other connection, information such as, for example, the time, the date, its current location, its speed, or direction of travel, as well as the SSID and BSSID of in-range Wi-Fi access points 110 to a computing system 900 of an original equipment manufacturer of the wireless device 150, an operating system developer (not shown), third-party software developer (not shown), or a dedicated asset tracking system of the present invention (not shown) configured to track assets. While the reporting aspect of wireless devices 150 is designed to improve the accuracy of location-based services, here, the reporting aspect provides an estimate of the location of one or more Wi-Fi access points 110 at a particular time and date without requiring the purposeful participation of any particular wireless device 150 in any particular Wi-Fi wireless network. This information may be used to determine the location of one or more assets with substantial accuracy, that may be further refined with the well-known Wi-Fi access point triangulation process typically used by wireless devices 150 to refine GPS accuracy or improve location services.

In other embodiments, in active scanning mode, one or more wireless devices 150 may transmit a probe request that is not directed to any particular Wi-Fi access point 110, requesting that all Wi-Fi access points 110 in range announce their presence. In response, in-range Wi-Fi access points 110 transmit a probe response which includes information that uniquely identifies the responding Wi-Fi access point 110 and, to those who recognize the association, the asset (e.g., 610, 620, 630, and 640) associated with it. As previously discussed, wireless devices 150 report, via a cellular or other connection, information such as, for example, the time, the date, its current location, its speed, or direction of travel, as well as the SSID and BSSID of in-range Wi-Fi access points 110 to a computing system 900 of an original equipment manufacturer (not shown) of the wireless device 150, an operating system developer (not shown), third-party software developer (not shown), or a dedicated asset tracking system of the present invention (not shown) configured to track assets.

While a single wireless device 150 is depicted in the figure, one of ordinary skill in the art will recognize that any number of wireless devices 150 may come in and out of range of the assets (e.g., 610, 620, 630, and 640) over time, each of which independently reports the time, the date, their location, and the SSID and BSSID of in-range Wi-Fi access points 110 as they are encountered (and other information that may be useful to the asset tracking task). In fact, the tracking accuracy may improve as a function of the number of unique identifications that take place over time, or potentially provide additional information such as movement of assets (e.g., 610, 620, 630, and 640) throughout the day, or the speeds at which they are moving, or even when they leave a boundary of the job site 650. While wireless device 150 is depicted as being disposed in a motor vehicle 670 driving 660 by a job site 650, one of ordinary skill in the art will recognize that wireless device 150 may be stationary or conveyed by any means conceived of so long as it is capable of participating in Wi-Fi wireless network discovery and thereby identifying, reporting, and effectively locating assets (e.g., 610, 620, 630, and 640) indirectly by reporting the Wi-Fi access points 110 discovered.

Figure 7A:
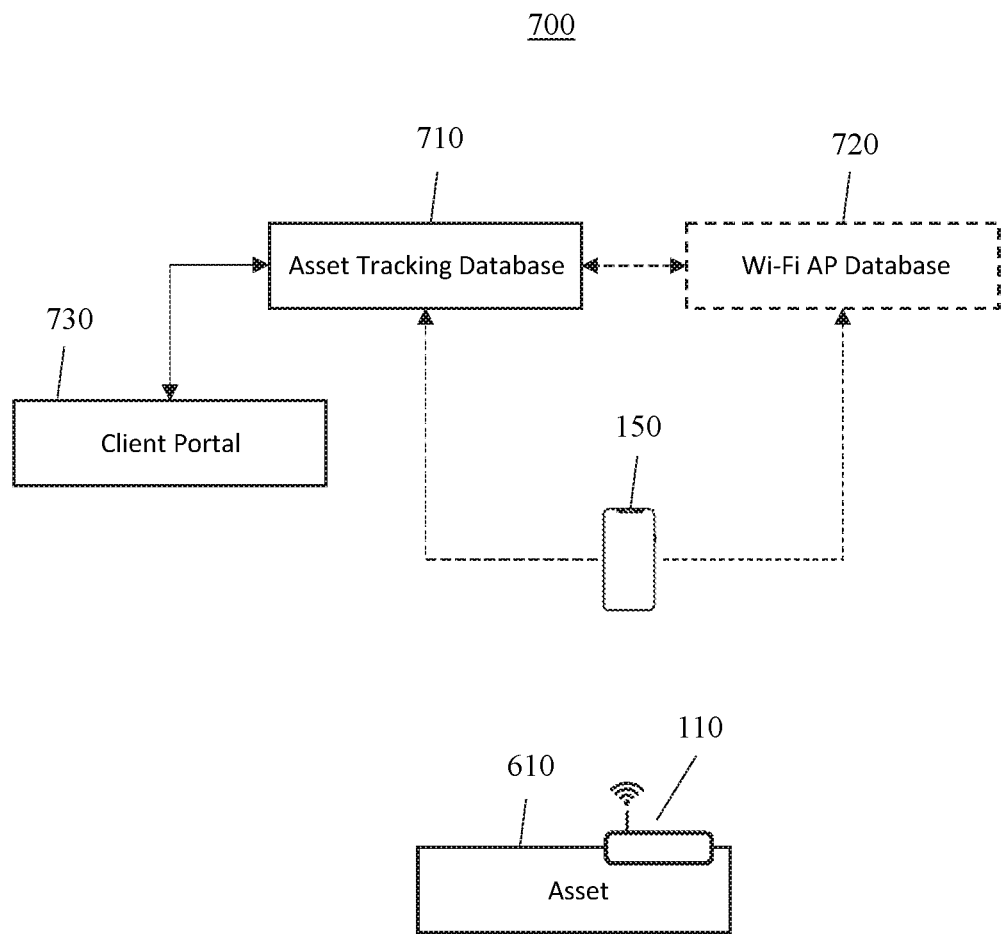
FIG. 7A shows a system for passive asset tracking with existing infrastructure in accordance with one or more embodiments of the present invention.

FIG. 7A shows a system 700 for passive asset tracking with existing infrastructure in accordance with one or more embodiments of the present invention. One or more Wi-Fi access points 110 may be disposed, or otherwise attached to, or integrated with one or more assets (e.g., 610) that are desired to be tracked. The unique identifying information of a Wi-Fi access point 110 may be used to uniquely identify an asset (e.g., 610) that it is physically and logically associated with. The one or more assets (e.g., 610) may then be deployed in the field and need not be co-located. The deployed Wi-Fi access points 110 do not require Internet connectivity or other network connection or be configured to receive GPS signals, they simply must be powered on and configured to either broadcast beacon frames or respond to probe requests as part of the Wi-Fi wireless network discovery process. When one or more wireless devices (e.g., 150) come into range of one or more of the Wi-Fi access points 110 disposed, or otherwise attached to, or integrated with, one or more assets (e.g., 610), the in-range Wi-Fi access points 110 may either broadcast their beacon frame or respond to a probe request with information that may be used to uniquely identify the corresponding assets (e.g., 610) as well as other information that may be useful to the asset tracking task including custom use of certain information in the beacon frame or probe response. As noted above, the one or more wireless devices 150 typically report the time, the date, their current location, as well as the SSID and BSSID of the in-range Wi-Fi access points 110 discovered either directly to an asset tracking database 710 or to a Wi-Fi AP Database 720 (third-party or integrated) that may provide data to asset tracking database 710. Wi-Fi AP Database 720 may be a database managed by an original equipment manufacturer, an operating system developer, or a third-party software developer, or a database integrated with asset tracking database 710. In certain embodiments, Wi-Fi AP Database 720 may be Android® or iOS® location services used to improve location determination accuracy. Asset tracking database 710 may use the data provided directly by one or more wireless devices 150 or indirectly by way of Wi-Fi AP Database 720 to identify and locate one or more assets (e.g., 610), the data of which may be stored in asset tracking database 710. Depending on the type of data received, asset tracking database 710 may manipulate, extrapolate, or otherwise generate data stored therein. A client portal 730, which may be software resident on another computing system (not shown), resident on the same computer (not shown) as the asset tracking database 710, or an application (not shown) executed on a wireless device (e.g., 150), that allows a user to interact with asset tracking database 710 and obtain relevant data contained therein.

In certain embodiments, system 700 for passive asset tracking with existing infrastructure may include asset tracking database 710 and may optionally include client portal 730. In other embodiments, system 700 may optionally include Wi-Fi AP Database 720, which is typically independent of system 700, as part of a closed wholistic embodiment of system 700. In such embodiments, Wi-Fi AP Database 720 may reside or execute on the same or a different computing system as that of asset tracking database 710 or be integrated with asset tracking database 710 or a software application thereof. In still other embodiments, system 700 may optionally include one or more Wi-Fi access points 110 disposed on, or otherwise attached to, one or more assets (e.g., 610). In still other embodiments, system 700 may optionally include one or more wireless devices 150, which are typically independent of system 700, that are configured to purposefully discover in-range Wi-Fi access points 110, as part of a closed wholistic embodiment of system 700. In such embodiments, wireless device 150 may include dedicated software (not shown) that reports the time, the date, and the SSID and BSSID of Wi-Fi access points 110 it encounters to asset tracking database 710 or Wi-Fi AP Database 720, if integrated. While various embodiments of system 700 have been disclosed, one of ordinary skill in the art will recognize that a subset, superset, or combination of functions or features thereof, may be integrated, distributed, or excluded, in whole or in part, based on an application, design, or form factor in accordance with one or more embodiments of the present invention and the above-disclosure is not intended to limit the types, kinds, or arrangements of system 700 that may be implemented, including those that include, integrate, separate, or exclude various aspects.

Continuing, FIG. 7B shows exemplary data 740 reported by a wireless device 150 relating to discovered Wi-Fi access points 110 in accordance with one or more embodiments of the present invention. Wireless device 150 may report, for example, identifying information of one or more in-range Wi-Fi access points 110, their relative signal strength, as well as the time, the date, and the GPS location of the reporting wireless device 150, to asset tracking database 710 or Wi-Fi AP Database 720. The identifying information may include one or more of the SSID, the BSSID, or other information that may be used to uniquely identify the Wi-Fi access point 110 including potentially other fields of the beacon frames or probe responses that may be repurposed to convey information regarding the Wi-Fi access point 110 or the asset it is associated with. For example, the SSID of a Wi-Fi access point 110 may be configured to be a unique identifier of the asset it is physically (by way of location, attachment, or integration) and logically (by way of asset tracking database 710) associated with. In addition, the MAC address, SSID, or other field may be used to identify a Wi-Fi access point 110 as an asset tracking type of Wi-Fi access point. In the future, such functionality could allow wireless devices 150 to take different action when an asset tracking type Wi-Fi access point is encountered, including potentially speeding up the identification, changes the nature of the reporting, or otherwise facilitating the asset tracking task. One of ordinary skill in the art will recognize that the type and kind of information reported by the wireless device 150 relating to a discovered Wi-Fi access point 110 or an asset (e.g., 610) associated therewith may vary based on an application or design in accordance with one or more embodiments of the present invention, but must at least include information that uniquely identifies the Wi-Fi access point 110.

Continuing, FIG. 7C shows exemplary data 720 stored or generated by asset tracking database 710 in accordance with one or more embodiments of the present invention. Asset tracking database 710 may associate unique identifying information, such as, for example, the BSSID, of a particular Wi-Fi access point 110 with a particular asset (e.g., 610) on which it is disposed, attached to, or integrated with. As such, asset tracking database 710 may then use information relating to the discovery of one or more Wi-Fi access points 110 that is reported by one or more wireless devices 150 to passively track one or more assets (e.g., 610) in an indirect manner, in many instances without an awareness by wireless devices 150 that they are participating in the asset tracking task.

Asset tracking database 710 may receive and store identifying information relating to a particular Wi-Fi access point 110 that is logically associated within the database 710 with a particular asset (e.g., 610) as well as the time, the date, and the GPS location of the wireless device 150 that reported the particular Wi-Fi access point 110. Asset tracking database 710 may also receive and store other information relating to the particular asset (e.g., 610) provided, directly or indirectly, by one or more wireless devices 150. Asset tracking database 710 may either receive, or determine through historical information or calculation, the last known location of the particular Wi-Fi access point 110, and by relation, the particular asset (e.g., 610). Asset tracking database 710 may also receive identifying information, the signal strength, the time, the date, and the GPS location of one or more wireless devices 110 reporting other discovered Wi-Fi access points 110. As such, Asset tracking database 710 may use any information, including, potentially, times, dates, GPS locations, last known positions, and signal strength to known Wi-Fi access points 110 and well known trilateration or triangulation techniques to refine the accuracy of the location determination of the particular Wi-Fi access point 110 and, by relation, the particular asset (e.g., 610). As such, asset tracking database 710 may develop a historical trend of location and potentially other information relating to the particular asset (e.g., 610) over a period of time.

Asset tracking database 710 may include a data structure that includes a time, a date, a GPS location, for example, a latitude ("GPS LAT") and a longitude ("GPS LNG"), an SSID, a BSSID, and a signal strength of a discovered Wi-Fi access point 110 as part of each report, received directly or indirectly, from a wireless device 150 that encounters an in-range Wi-Fi access point 110. The BSSID of the discovered Wi-Fi access point 110 may be associated with, or used to reference, a particular asset (e.g., 610) being tracked.

Asset tracking database 710 may receive, calculate, or estimate a last known ("AP LK") position of the discovered Wi-Fi access point 110. If a last know position of a Wi-Fi access point 110 is not known, it may be estimated by the GPS location of the most recent wireless device 150 that reported discovery of the Wi-Fi access point 110 or further refined with Wi-Fi triangulation or trilateration techniques. Asset tracking database 710 may, based on available information, calculate a current ("AP CUR") location for one or more Wi-Fi access points 110, and by relation, the associated assets (e.g., 610) thereof. One of ordinary skill in the art will appreciate that calculating a location based on the last known location of one or more Wi-Fi access points, if any, the GPS locations of one or more wireless devices 150 reporting the Wi-Fi access points 110, if available, and their relative signal strengths, and potentially other information relating thereto, may be used to determine or refine the location determination of one or more Wi-Fi access points 110, and assets associated therewith, using well known Wi-Fi location refinement techniques. The calculated current location may be stored in asset tracking database 710 as the best estimate where a particular Wi-Fi access point 110, and by relation, asset (e.g., 610) may be located.

One of ordinary skill in the art will recognize that asset tracking database 710 may receive, generate, or store other data relating to a Wi-Fi access point 110, an asset (e.g., 610) associated therewith, or other metrics based on an application or design in accordance with one or more embodiments of the present invention.

Figure 7D:
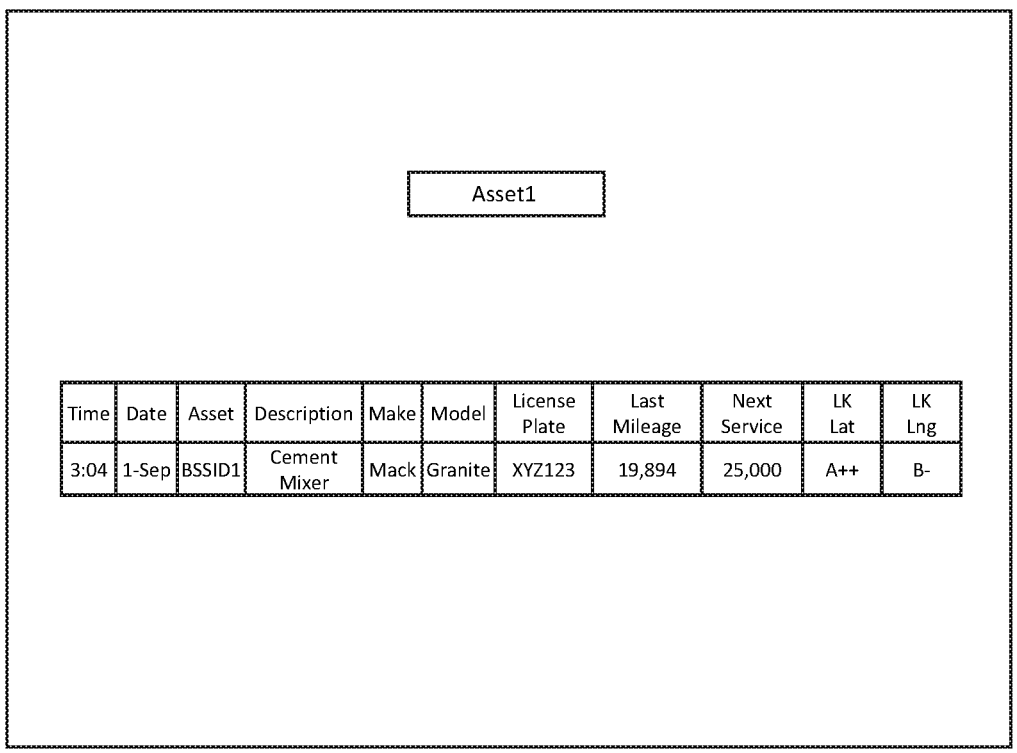
FIG. 7D shows an exemplary client portal to the asset tracking database in accordance with one or more embodiments of the present invention.

FIG. 7D shows an exemplary client portal 760 to asset tracking database 710 in accordance with one or more embodiments of the present invention. A user (not shown) may access the data contained within asset tracking database 710 via client portal 760 accessible via the same computer (not shown) on which the asset tracking database 710 is resident and executing, on another computer (not shown) with a network connection to asset tracking database 710, or via a software application, potentially resident and executing on a wireless device (not shown) with a network connection to asset tracking database 710. One of ordinary skill in the art will recognize that client portal 760 may be disposed on any computer based on an application or design in accordance with one or more embodiments of the present invention. Client portal 760 may provide the user with the ability to access at least some of the data stored in asset tracking database 710. For example, a user may inquire as to the location of a specific asset. Client portal 760 lodges the query with asset tracking database 710, receives the requested data, which in this case, may be the unique identifying information of the asset as well as its last known location. One of ordinary skill in the art will recognize that the interface, interaction with, and display of, data by client portal 760 may vary based on an application or design and may include graphical output (not shown), such as, for example, locations on a map where assets are located, in accordance with one or more embodiments of the present invention.

In one or more embodiments of the present invention, a method of passive asset tracking with existing independent infrastructure may include disposing a Wi-Fi access point on, in, or otherwise attaching to, or integrating with, a moveable physical asset to be tracked. The Wi-Fi access point may be a conventional off-the-shelf, industrial, battery-powered, or any other type or kind of Wi-Fi access point. However, because the Wi-Fi access point does not require routing features or true Wi-Fi functionality beyond that of participating in the Wi-Fi wireless network discovery protocol, custom Wi-Fi access points that eliminate features not implemented may be used to reduce the footprint and the power consumption of such a device. In addition, devices configured to spoof the Wi-Fi wireless network discovery protocol may be used specifically for the asset tracking task. Notwithstanding, one of ordinary skill in the art will recognize that any Wi-Fi access point, or related device, capable of participating in Wi-Fi wireless network discovery protocol may be used in accordance with one or more embodiments of the present invention.

The method may further include logically associating unique identifying information of the Wi-Fi access point with the asset in an asset tracking database. The unique identifying information may be any information that uniquely identifies the Wi-Fi access point including, for example, the BSSID of the Wi-Fi access point. The asset tracking database may be any type or kind of database or software application configured to store and potentially manipulate data. The Wi-Fi access point associated with a particular moveable asset may be stored in the same or a related record in the asset tracking database or otherwise related indicating their association, specifically, using the location of the Wi-Fi access point as a proxy for the location of the asset.

The method may further include receiving information relating to a location of the Wi-Fi access point encountered by one or more wireless devices and storing at least part of the information received in the asset tracking database. In certain embodiments, the information relating to the location of the Wi-Fi access point encountered is received directly or indirectly from a Wi-Fi AP Database or third-party provider. In other embodiments, the information relating to the location of the Wi-Fi access point encountered is received directly or indirectly from one or more of the reporting wireless devices. In certain embodiments, the one or more wireless devices, or users thereof, may not be aware that they are participating in the asset tracking task. The wireless devices simply report their location and the unique identifying information of Wi-Fi access points they encounter as part of their participation in location services. In other embodiments, the one or more wireless devices may be used to intentionally participate in the asset tracking task. In all such embodiments, whenever a wireless device comes in-range of a Wi-Fi access point and receives unique identifying information about the Wi-Fi access point, the wireless device reports at least its location and the unique identifying information of the Wi-Fi access point, typically over a cellular connection, directly or indirectly to one or more of an original equipment manufacturer, an operating system developer, a location-based services provider, a Wi-Fi AP Database, or a third-party software application or database, or directly to the asset tracking database itself. The information relating to the location of the wireless device may include, for example, a time, a data, a GPS location of the reporting wireless device, a last known location of the Wi-Fi access point, the unique identifying information of other in-range Wi-Fi access points, and their respective signal strengths. One of ordinary skill in the art will recognize that other information may be used and may vary based on an application or design in accordance with one or more embodiments of the present invention. As such, the information relating to the location of the Wi-Fi access point may be received by the asset tracking database directly or indirectly from one or more wireless devices that report their location as well as the unique identifying information of one or more Wi-Fi access points that they encounter.

The method may further include tracking the location of the Wi-Fi access point, and by relation, the asset itself, in the asset tracking database. The asset tracking database may maintain a record of reports relating to the Wi-Fi access point and receive or calculate an estimated location for the Wi-Fi access point, and by relation, the asset itself. This information may be stored in the asset tracking database as the estimated current location of the asset with any other information suitable for storing in the asset tracking database. As noted above, the asset tracking database may receive information that provides an estimate of a location of the Wi-Fi access point or information that may be used to estimate the location of the Wi-Fi access point using one or more of GPS determined locations, Wi-Fi access point locations and potentially associated signal strengths, trilateration, or triangulation. The method may further include providing a user access to information stored in the asset tracking database via a client portal. The client portal may include a software interface for querying and receiving information from the asset tracking database. The client portal may be part of the same computing system as that of the asset tracking database or a separate and distinct computing system or wireless device that connects to the asset tracking database over a network connection. In one or more embodiments of the present invention, a non-transitory computer readable medium comprising software instructions, when executed by a processor, may perform any of the above-noted methods.

In one or more embodiments of the present invention, a system for passive asset tracking with existing independent infrastructure may include a computing system having a central processing unit, a system memory, a network interface, and a storage device and a Wi-Fi access point disposed on, in, or otherwise attached to, a moveable asset to be tracked. An asset tracking database executing on the computing system may associate unique identifying information of the Wi-Fi access point with the asset. The asset tracking database may receive information relating to a location of the Wi-Fi access point identified by its unique identifying information transmitted as part of Wi-Fi wireless network discovery. The asset tracking database may track the location of the Wi-Fi access point and, by relation, the associated asset.

Figure 8:
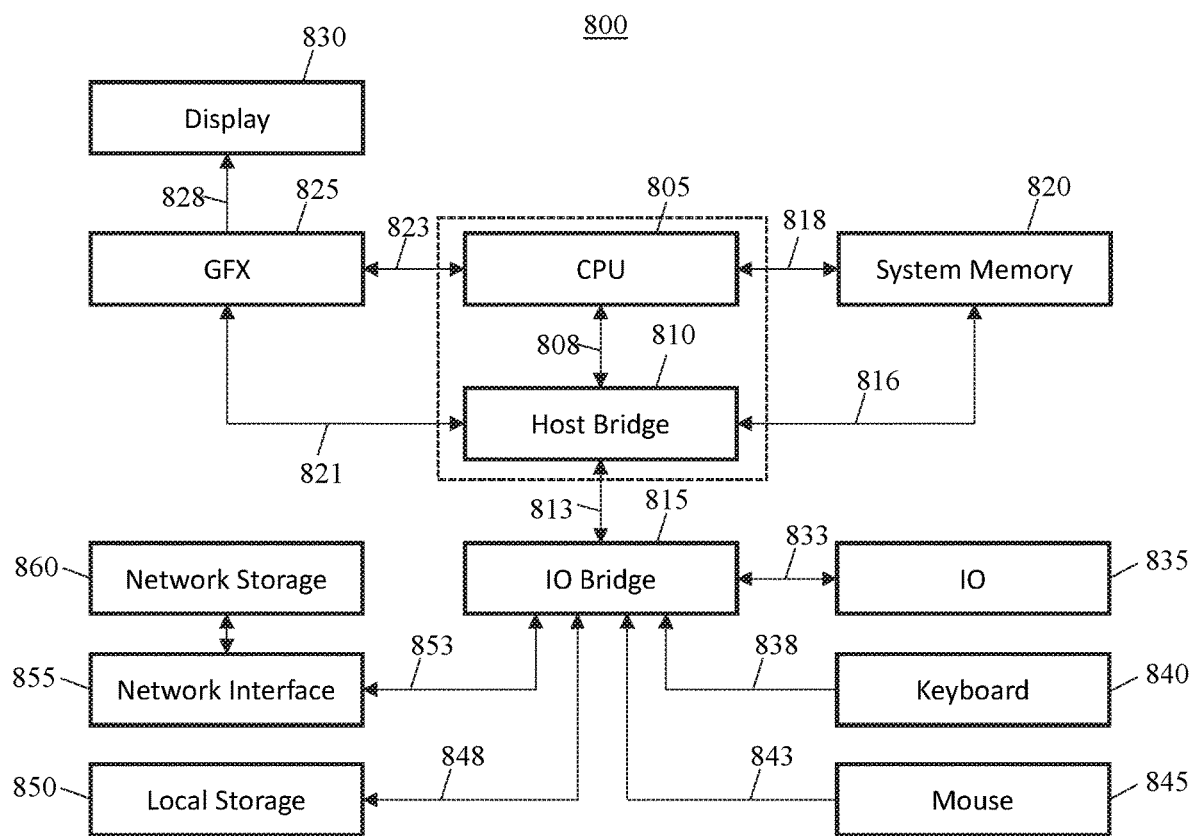
FIG. 8 shows a computing system in accordance with one or more embodiments of the present invention.

FIG. 8 shows a computing system 800 in accordance with one or more embodiments of the present invention. One or more of asset tracking database (e.g., 710 of FIG. 7), Wi-Fi AP Database (e.g., 720 of FIG. 7), or client portal (e.g., 760 of FIG. 7) may be software applications containing software instructions that, when executed by a processor of a computing system 800, perform one or more of the above-noted methods. One of ordinary skill in the art will recognize that a computing system 800 disclosed herein is merely exemplary of a computing system that may be used to execute any of the above-noted software and other computing systems well known in the art may be used in accordance with one or more embodiments of the present invention.

Computing system 800 may include one or more central processing units, sometimes referred to as processors (hereinafter referred to in the singular as "CPU" or plural as "CPUs") 805, host bridge 810, input/output ("IO") bridge 815, graphics processing units (singular "GPU" or plural "GPUs") 825, and/or application-specific integrated circuits (singular "ASIC or plural "ASICs") (not shown) disposed on one or more printed circuit boards (not shown) that perform computational operations. Each of the one or more CPUs 805, GPUs 825, or ASICs (not shown) may be a single-core (not independently illustrated) device or a multi-core (not independently illustrated) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 805 may be a general-purpose computational device typically configured to execute software instructions. CPU 805 may include an interface 808 to host bridge 810, an interface 818 to system memory 820, and an interface 823 to one or more IO devices, such as, for example, one or more GPUs 825. GPU 825 may serve as a specialized computational device typically configured to perform graphics functions related to frame buffer manipulation. However, one of ordinary skill in the art will recognize that GPU 825 may be used to perform non-graphics related functions that are computationally intensive. In certain embodiments, GPU 825 may interface 823 directly with CPU 805 (and interface 818 with system memory 820 through CPU 805). In other embodiments, GPU 825 may interface 821 with host bridge 810 (and interface 816 or 818 with system memory 820 through host bridge 810 or CPU 805 depending on the application or design). In still other embodiments, GPU 825 may interface 833 with IO bridge 815 (and interface 816 or 818 with system memory 820 through host bridge 810 or CPU 805 depending on the application or design). The functionality of GPU 825 may be integrated, in whole or in part, with CPU 805.

Host bridge 810 may be an interface device that interfaces between the one or more computational devices and IO bridge 815 and, in some embodiments, system memory 820. Host bridge 810 may include an interface 808 to CPU 805, an interface 813 to IO bridge 815, for embodiments where CPU 805 does not include an interface 818 to system memory 820, an interface 816 to system memory 820, and for embodiments where CPU 805 does not include an integrated GPU 825 or an interface 823 to GPU 825, an interface 821 to GPU 825. The functionality of host bridge 810 may be integrated, in whole or in part, with CPU 805. IO bridge 815 may be an interface device that interfaces between the one or more computational devices and various IO devices (e.g., 840, 845) and IO expansion, or add-on, devices (not independently illustrated). IO bridge 815 may include an interface 813 to host bridge 810, one or more interfaces 833 to one or more IO expansion devices 835, an interface 838 to keyboard 840, an interface 843 to mouse 845, an interface 848 to one or more local storage devices 850, and an interface 853 to one or more network interface devices 855. The functionality of IO bridge 815 may be integrated, in whole or in part, with CPU 805 and/or host bridge 810. Each local storage device 850, if any, may be a solid-state memory device, a solid-state memory device array, a hard disk drive, a hard disk drive array, or any other non-transitory computer readable medium. Network interface device 855 may provide one or more network interfaces including any network protocol suitable to facilitate networked communications.

Computing system 800 may include one or more network-attached storage devices 860 in addition to, or instead of, one or more local storage devices 850. Each network-attached storage device 860, if any, may be a solid-state memory device, a solid-state memory device array, a hard disk drive, a hard disk drive array, or any other non-transitory computer readable medium. Network-attached storage device 860 may or may not be collocated with computing system 800 and may be accessible to computing system 800 via one or more network interfaces provided by one or more network interface devices 855.

One of ordinary skill in the art will recognize that computing system 800 may be a conventional computing system or an application-specific computing system (not shown). In certain embodiments, an application-specific computing system (not shown) may include one or more ASICs (not shown) that perform one or more specialized functions in a more efficient manner. The one or more ASICs (not shown) may interface directly with CPU 805, host bridge 810, or GPU 825 or interface through IO bridge 815. Alternatively, in other embodiments, an application-specific computing system (not shown) may be reduced to only those components necessary to perform a desired function in an effort to reduce one or more of chip count, printed circuit board footprint, thermal design power, and power consumption. The one or more ASICs (not shown) may be used instead of one or more of CPU 805, host bridge 810, IO bridge 815, or GPU 825. In such systems, the one or more ASICs may incorporate sufficient functionality to perform certain network and computational functions in a minimal footprint with substantially fewer component devices.

As such, one of ordinary skill in the art will recognize that CPU 805, host bridge 810, IO bridge 815, GPU 825, or ASIC (not shown) or a subset, superset, or combination of functions or features thereof, may be integrated, distributed, or excluded, in whole or in part, based on an application, design, or form factor in accordance with one or more embodiments of the present invention. Thus, the description of computing system 800 is merely exemplary and not intended to limit the type, kind, or configuration of component devices that constitute a computing system 800 suitable for executing software methods in accordance with one or more embodiments of the present invention. Notwithstanding the above, one of ordinary skill in the art will recognize that computing system 800 may be a standalone, laptop, desktop, industrial, server, blade, or rack mountable system and may vary based on an application or design.

Advantages of one or more embodiments of the present invention may include one or more of the following:

In one or more embodiments of the present invention, a method and system for passive asset tracking with existing infrastructure allows for passively tracking moveable assets by one or more potentially unrelated wireless devices that are in-range of assets broadcasting Wi-Fi signals even though the wireless device, or user thereof, may not even know they are participating in the asset tracking task. In this way, every smartphone in the vicinity of an asset that is desired to be tracked may, anonymously, and without awareness, participate in the asset tracking task.

In one or more embodiments of the present invention, a method and system for passive asset tracking with existing infrastructure leverage already existing devices, systems, and networks to passively track the location of assets without requiring the asset itself to have any connectivity to the Internet or other network connection.

In one or more embodiments of the present invention, a method and system for passive asset tracking with existing infrastructure uses one or more Wi-Fi access points, that do not require connectivity to any particular network, to identify one or more assets in the field using Wi-Fi wireless network discovery and Wi-Fi access point reporting features of modern smartphones and location services to passively identify the location of the one or more assets. The moveable assets may be passively tracked by one or more wireless devices that may be independent and unrelated whenever any one or more of the wireless devices merely come into range of an asset associated with a Wi-Fi access point broadcasting Wi-Fi signals, without any intent or awareness on the part of the wireless device, or user thereof, that they are participating in the asset tracking task due to the nature of the Wi-Fi wireless network discovery protocol.

In one or more embodiments of the present invention, a method and system for passive asset tracking with existing infrastructure leverages existing infrastructure inherent in smartphones, operating systems, and software applications to report their location as well as the unique identifying information of Wi-Fi access points they encounter for improving the accuracy of location-based services for the asset tracking task without their awareness.

In one or more embodiments of the present invention, a method and system for passive asset tracking with existing infrastructure uses the Wi-Fi wireless network discovery protocol as well as the Wi-Fi access point reporting feature of smartphones to passively track assets associated with Wi-Fi access points by one or more wireless devices without requiring that the wireless devices associate with any particular Wi-Fi access point, using publicly accessibly Wi-Fi signals, and in passive scanning applications, completely anonymously with respect to the asset tracking task.

In one or more embodiments of the present invention, a method and system for passive asset tracking with existing infrastructure, a Wi-Fi access point associated with an asset does not require any connectivity to the Internet or any other network connection and does not require a GPS receiver, relying instead on the one or more wireless devices to report the time, date, and relative location of the in-range Wi-Fi access point associated with the asset.

In one or more embodiments of the present invention, a method and system for passive asset tracking with existing infrastructure, an asset tracking database receives unique information identifying and information relating to the location of one or more Wi-Fi access points received directly or indirectly from one or more wireless devices or a Wi-Fi AP Database. The location of the asset may be tracked in the asset tracking database by the location of the Wi-Fi access point.

In one or more embodiments of the present invention, a method and system for passive asset tracking with existing infrastructure may use a Wi-Fi access point that allows for the assignment of alternative meanings to various parts of the beacon frame or probe response corresponding to attributes of the Wi-Fi access point or asset physically and logically associated with it.

In one or more embodiments of the present invention, a method and system for passive asset tracking with existing infrastructure reduces theft by providing a trackable asset without conventional asset tracking hardware or software systems. If the perpetrator of the theft moves a trackable asset within range of any one or more wireless devices, the discovery of the Wi-Fi access point will be reported, and the asset tracking database will be able to locate the associated asset without the perpetrator knowing that the asset has been tracked.

In one or more embodiments of the present invention, a method and system for passive asset tracking with existing infrastructure substantially reduces the complexity and cost associated with deploying a comprehensive asset tracking system. As opposed to conventional asset tracking systems, one or more wireless devices, which may be completely independent of and unrelated to the asset tracking task, serve as the tracking infrastructure.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A method of passive asset tracking comprising:
    associating unique identifying information of a Wi-Fi access point with a moveable asset to be tracked, wherein the Wi-Fi access point broadcasts the unique identifying information in a probe response frame as part of Wi-Fi wireless network discovery protocol;
    receiving information relating to a location of the Wi-Fi access point encountered by a wireless device, wherein the information comprises one or more of information relating to a GPS location of the reporting wireless device, a last known location of the Wi-Fi access point, or information relating to other in-range Wi-Fi access points, and their respective signal strengths, wherein the information is received directly or indirectly from the wireless device that reports its location and the unique identifying information of the Wi-Fi access point encountered, and wherein the wireless device is not required to associate with the Wi-Fi access point encountered;
    determining a location of the moveable asset to be tracked based, at least in part, on the location of the Wi-Fi access point as proxy for the location of the moveable asset to be tracked; and
    providing a user access to information relating to the location of the moveable asset to be tracked.

2. The method of claim 1, further comprising:
    disposing the Wi-Fi access point on, or attaching the Wi-Fi access point to, the moveable asset to be tracked.

3. The method of claim 1, wherein the wireless device, or user thereof, is not required to actively participate in the asset tracking task.

4. The method of claim 1, wherein the Wi-Fi access point is required to participate in the Wi-Fi wireless network discovery protocol, but is not required to provide Internet connectivity or any other network connection.

5. The method of claim 1, wherein the unique identifying information comprises a BSSID of the Wi-Fi access point.

6. The method of claim 1, wherein the information relating to the location of the Wi-Fi access point is received directly or indirectly from a Wi-Fi AP Database.

7. The method of claim 6, wherein the Wi-Fi AP Database comprises a database managed by an original equipment manufacturer, an operating system developer, or a third-party software developer.

8. A non-transitory computer readable medium comprising software instructions that, when executed by a processor perform a method of passive asset tracking comprising:
    associating unique identifying information of a Wi-Fi access point with a moveable asset to be tracked, wherein the Wi-Fi access point broadcasts the unique identifying information in a probe response frame as part of Wi-Fi wireless network discovery protocol;
    receiving information relating to a location of the Wi-Fi access point encountered by a wireless device, wherein the information comprises one or more of information relating to a GPS location of the reporting wireless device, a last known location of the Wi-Fi access point, or information relating to other in-range Wi-Fi access points, and their respective signal strengths, wherein the information is received directly or indirectly from the wireless device that reports its location and the unique identifying information of the Wi-Fi access point encountered, and wherein the wireless device is not required to associate with the Wi-Fi access point encountered;
    determining a location of the moveable asset to be tracked based, at least in part, on the location of the Wi-Fi access point as proxy for the location of the moveable asset to be tracked; and
    providing a user access to information relating to the location of the moveable asset to be tracked.

9. The computer readable medium of claim 8, further comprising:
    disposing the Wi-Fi access point on, or attaching the Wi-Fi access point to, the moveable asset to be tracked.

10. The computer-readable medium of claim 8, wherein the wireless device, or user thereof, is not required to actively participate in the asset tracking task.

11. The computer-readable medium of claim 8, wherein the Wi-Fi access point is required to participate in the Wi-Fi wireless network discovery protocol, but is not required to provide Internet connectivity or any other network connection.

12. The computer readable medium of claim 8, further comprising:
providing a user access to information relating to the location of the moveable asset to be tracked.

13. The computer readable medium of claim 8, wherein the unique identifying information comprises a BSSID of the Wi-Fi access point.

14. The computer readable medium of claim 8, wherein the information relating to the location of the Wi-Fi access point is received directly or indirectly from a Wi-Fi AP Database.

15. The computer readable medium of claim 14, wherein the Wi-Fi AP Database comprises a database managed by an original equipment manufacturer, an operating system developer, or a third-party software developer.

16. A system for passive asset tracking comprising:
a computing system comprising;
  a central processing unit,
  a system memory,
  a network interface, and
  a storage device;
a Wi-Fi access point disposed on, or otherwise attached to, a moveable asset to be tracked, wherein the Wi-Fi access point broadcasts unique identifying information in a probe response frame as part of Wi-Fi wireless network discovery protocol; and
an asset tracking database executing on the computing system that associates the unique identifying information of the Wi-Fi access point with the moveable asset to be tracked,
wherein the asset tracking database receives information relating to a location of the Wi-Fi access point encountered by a wireless device, wherein the information comprises one or more of information relating to a GPS location of the reporting wireless device, a last known location of the Wi-Fi access point, or information relating to other in-range Wi-Fi access points, and their respective signal strengths, wherein the information is received directly or indirectly from the wireless device that reports its location and the unique identifying information of the Wi-Fi access point encountered, and wherein the wireless device is not required to associate with the Wi-Fi access point encountered,
wherein the asset tracking database determines a location of the moveable asset to be tracked based, at least in part, on the location of the Wi-Fi access point as proxy for the location of the moveable asset to be tracked, and
wherein the asset tracking database provides a user access to information relating to the location of the moveable asset to be tracked.

17. The system of claim 16, wherein the wireless device, or user thereof, is not required to actively participate in the asset tracking task.

18. The system of claim 16, wherein the Wi-Fi access point is required to participate in the Wi-Fi wireless network discovery protocol, but is not required to provide Internet connectivity or any other network connection.

19. The system of claim 16, wherein the unique identifying information comprises a BSSID of the Wi-Fi access point.

20. The system of claim 16, wherein the information relating to the location of the Wi-Fi access point is received directly or indirectly from a Wi-Fi AP Database.

21. The system of claim 20, wherein the Wi-Fi AP Database comprises a database managed by an original equipment manufacturer, an operating system developer, or a third-party software developer.

* * * * *